United States Patent [19]

Nakajima

[11] Patent Number: 5,321,820
[45] Date of Patent: Jun. 14, 1994

[54] PROCESSOR FOR EXECUTING A CONDITIONAL BRANCH INSTRUCTION AT A HIGH SPEED BY PRE-READING A RESULT FLAG

[75] Inventor: Masaitsu Nakajima, Osaka, Japan

[73] Assignee: Matsushita Electric Industrial Co., Ltd., Osaka, Japan

[21] Appl. No.: 729,126

[22] Filed: Jul. 12, 1991

[30] Foreign Application Priority Data

Jul. 13, 1990 [JP] Japan ................................ 2-186068

[51] Int. Cl.⁵ ............................................ G06F 9/38
[52] U.S. Cl. .................... 395/375; 364/261.3; 364/261.5; 364/231.8; 364/261.7; 364/DIG. 1
[58] Field of Search ................................ 395/375, 800

[56] References Cited

U.S. PATENT DOCUMENTS

| | | | |
|---|---|---|---|
| 4,338,661 | 7/1982 | Tredennick | 395/375 |
| 5,081,574 | 1/1992 | Larsen | 395/375 |
| 5,133,077 | 7/1992 | Karne | 395/800 |
| 5,142,489 | 8/1992 | Yamaki | 364/736 |
| 5,185,869 | 2/1993 | Suzuki | 395/375 |

Primary Examiner—Eric Coleman
Attorney, Agent, or Firm—Lowe, Price, LeBlanc & Becker

[57] ABSTRACT

A processor which is provided with an execution portion having an n-stage pipeline for performing an operation on input data and for outputting the result of the operation and a result flag representing the state of the result of the operation, an internal-state register for storing the result flag as data indicating the internal state of the processor, an instruction-fetch-address generating portion for determining from the data indicating the internal state of the processor or from the result flag whether or not a branch condition of a conditional branch instruction is satisfied and for generating an instruction fetch address, and a result flag generating portion for receiving the input data and for outputting a pre-read result flag determined prior to the completion of the operation effected in the execution portion and a pre-read result-flag determination signal indicating that the pre-read result flag is determined to the instruction-fetch-address generating portion. In the processor, the instruction-fetch-address generating portion determines whether or not the branch condition of the conditional branch instruction is satisfied by using the pre-read result flag of which the determination is indicated by the pre-read result-flag determination signal and generates an instruction fetch address.

6 Claims, 3 Drawing Sheets

IR: INTERMEDIATE RESULT
TIA: TARGET-INSTRUCTION-ADDRESS
IFA: INSTRUCTION-FETCH-ADDRESS

PROCESSOR FOR EXECUTING A CONDITIONAL BRANCH INSTRUCTION AT A HIGH SPEED BY PRE-READING A RESULT FLAG

BACKGROUND OF THE INVENTION

1. Field of The Invention

This invention generally relates to a processor and more particularly to a processor suitable for executing a conditional branch instruction at a high speed.

2. Description of The Related Art

Referring first to FIG. 3, there is illustrated the construction of a prior part processor. Reference numeral 1 designates an execution portion which has three pipeline stages for performing a processing on input data and outputs a result of the processing and a result flag representing the state of the result of the processing when receiving three clock pulses after the input data is inputted thereto. The result flag includes information representing information on "an EQUAL ZERO flag", "a PLUS flag" and "a MINUS flag" which will be described later. For simplicity of description, the number of the execution portion is assumed to be 1. Incidentally, the number of pipeline stages is also assumed for simplicity of description to be 3 but may be other than 3. Further, reference numeral 2 denotes an internal-state register for storing a code (hereunder referred to as an internal-state code) representing the internal state of the processor by using the result flag outputted from the execution portion 1. Reference numeral 3 designates an instruction-fetch-address generating portion for generating an instruction fetch address, which is comprised of a next address generating portion 4, a target-instruction-address generating portion 5, a selector 6 and a control portion 7 for controlling the selector 6. Usually, an instruction fetch address selected by the selector 6 is incremented by the next address generating portion 4. Then, the incremented address is outputted as the next address. When a branch instruction is executed, a target instruction address is generated by the target-instruction-address generating portion 5. Further, the generated target instruction address is outputted as an instruction fetch address. When a conditional branch instruction is executed, the control portion 7 determines from the internal-state code stored in the register 2 or from the result flag whether or not a corresponding branch is taken (namely, a corresponding branch condition is satisfied). If taken, the control portion 7 controls and causes the selector 6 to output a target instruction address.

Hereinafter, an operation (especially, the execution of a conditional branch instruction) of the prior art processor will be described by referring to the accompanying drawing. When a conditional branch instruction is used in a program, it is usual to employ a method by which an operation instruction is first executed and the internal-state code held in the register 2 is then changed according to the result of the execution of the operation instruction and subsequently it is determined from the internal-state code stored in the register 2 whether or not the branch is taken (namely, the branch condition of the conditional branch instruction is met). For example, an operation of the processor will be described hereinbelow when the following assembler instructions of an assembler program are executed:

| | |
|---|---|
| FMUL ... | fr00, fr01, fr02 |
| BRcc | PLUS, lavel0 |
| ... | |

Namely, when the floating-point multiplication instruction FMUL is executed, the multiplication of data stored at the addresses fr01 and fr02 is first performed and then the result of the multiplication is stored in a location corresponding to the address fr00. Subsequently, the conditional branch instruction BRcc is executed. At that time, it is determined from the inter-state data changed according to the result stored at the address fr00 whether or not the branch is taken. In this case, if the PLUS flag is on, it is determined that the branch is taken (namely, the branch condition is satisfied). Thus, the program branches to the address lavel0.

Referring next to FIG. 4, there is illustrated the timing of operations of the prior art processor of FIG. 3 when this program is executed. The result of the operation (namely, the multiplication) effected by executing the FMUL instruction, as well as the result flag, is outputted when receiving three clock pulses after an input of data. Further, the BRcc instruction cannot be executed until the result is outputted. Namely, a wait cycle equivalent to two clock cycles is inserted between the input of the data and the execution of the BRcc instruction. Therefore, in case where a conditional branch instruction is executed in accordance with the internal-state code changed by performing an operation, the prior art processor as above constructed can determine a result flag only when the result of the operation is outputted. Consequently, the prior art processor cannot execute a conditional branch instruction only after an operation is completely accomplished. This has become an obstacle to the realization of a high-speed processing. The present invention is created to eliminate the above described drawback of the prior art processor.

It is accordingly an object of the present invention to provide a processor which can execute a conditional branch instruction at a high speed.

SUMMARY OF THE INVENTION

To achieve the foregoing object and in accordance with the present invention, there is provided a processor which comprises an execution portion having an n-stage pipeline for performing an operation on input data and for outputting the result of the operation and a result flag representing the state of the result of the operation, an internal-state register for storing the result flag as data indicating the internal state of the processor, an instruction-fetch-address generating portion for determining from the data indicating the internal state of the processor or from the result flag whether or not a branch condition of a conditional branch instruction is satisfied and for generating an instruction fetch address, and which further comprises a result flag generating portion for receiving the input data and for outputting to the instruction-fetch-address generating portion a pre-read result flag, generated by evaluating the input data prior to the completion of the operation effected in the execution portion, and a pre-read result-flag determination signal indicating that the pre-read result flag is determined, and in which the instruction-fetch-address generating portion determines whether or not the branch condition of the conditional branch instruction is satisfied by using the pre-read result flag, the determination of which is indicated by the pre-read result-flag determination signal, and generates an instruction fetch address.

Thereby, the processor can execute a conditional branch instruction before the execution of the conditional branch instruction is completed and the internal-state code is changed. Consequently, a conditional branch instruction can be executed at a very high speed. Thus, the processor of the present invention is of great practical use.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Hereinafter, a preferred embodiment of the present invention will be described in detail by referring to the accompanying drawings.

Figure 1:
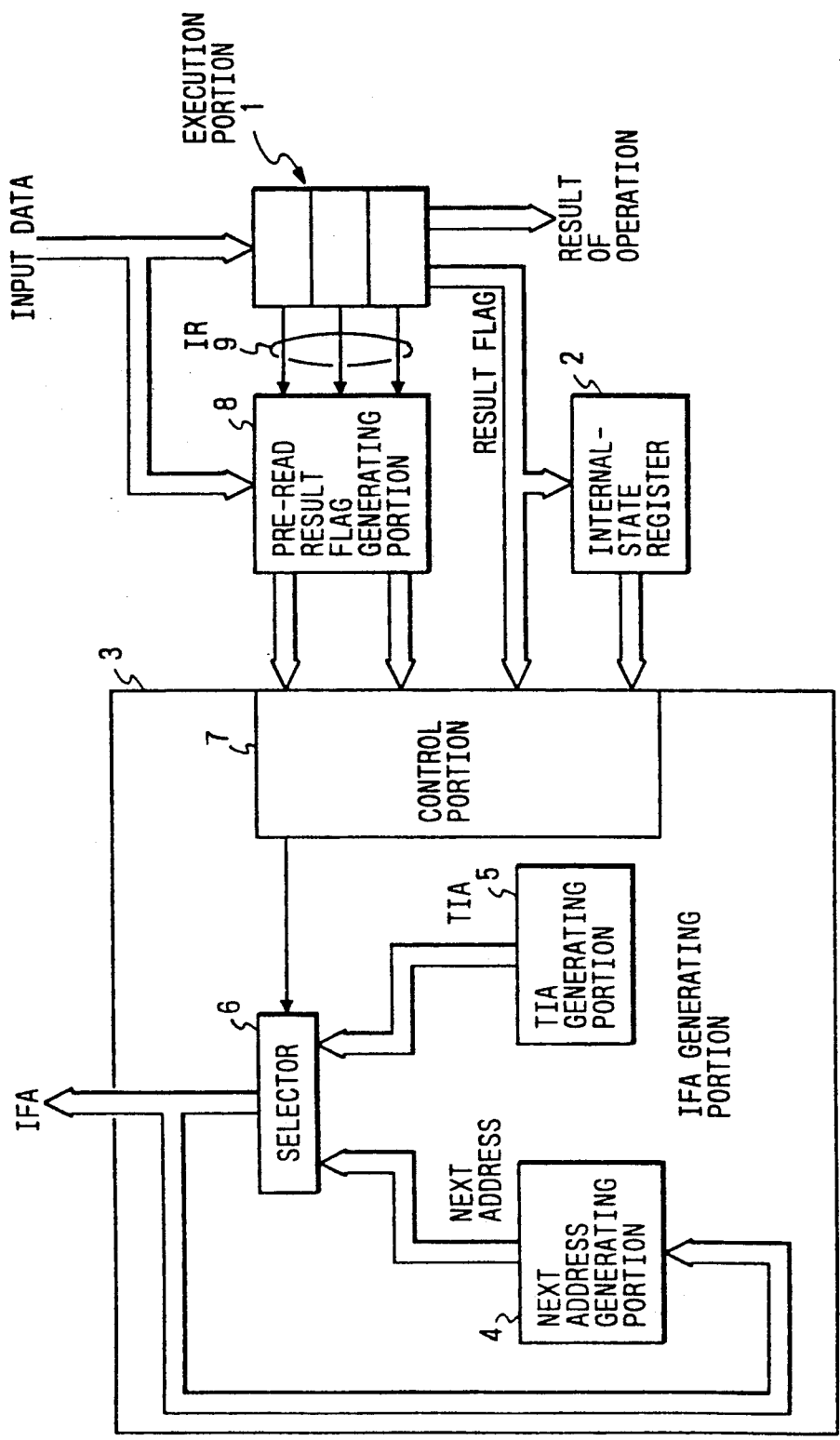
FIG. 1 is a schematic block diagram for illustrating the construction of a processor of the present invention.

Referring first to FIG. 1, there is shown the construction of a processor embodying the present invention. In this figure, like reference numerals designate like or corresponding portions of the prior art processor. Namely, reference numeral 1 designates an execution portion which has a three-stage pipeline for performing a processing on input data and outputs a result of the processing and a result flag representing the state of the result of the processing when receiving three clock pulses after the input data is inputted thereto. The result flag includes information representing information on "and EQUAL ZERO flag" (hereunder referred to simply as "a ZERO flag"), "a PLUS flag" and "a MINUS flag" to be described later. For simplicity of description, the number of the execution portion is assumed to be 1. Incidentally, the number of pipeline stages is also assumed for simplicity of description to be 3 but may be other than 3. Reference numeral 2 denotes an internal-state register for storing an internal-state code representing the internal state of this processor by using the result flag outputted from the execution portion 1. Further, reference numeral 3 designates an instruction-fetch-address generating portion for generating an instruction fetch address, which consists of a next address generating portion 4, a target-instruction-address generating portion 5, a selector 6 and a control portion 7 for controlling the selector 6. Usually, an instruction fetch address selected by the selector 6 is incremented by the next address generating portion 4. Subsequently, the incremented address is outputted therefrom to the selector 6 as the next address. When a branch instruction is executed, a target instruction address is generated by the target-instruction-address generating portion 5. Further, the generated target instruction address is outputted therefrom through the selector 6 as an instruction fetch address. Reference numeral 8 designates a pre-read result flag generating portion which inputs the same data inputted to the execution portion 1 and generates a pre-read result flag by using intermediate results sent from the execution portion 1 in parallel with the execution of an operation in the execution portion 1. Then, the pre-read result flag generating portion 8 outputs the generated and determined pre-read result flag to the instruction fetch address generating portion 3. Incidentally, when receiving input data a and b, the pre-read result flag generating portion 8 generates the pre-read result flag (namely, the portion 8 sets the PLUS flag, the MINUS flag and the ZERO flag included in the pre-read result flag by obtaining the values "plus", "minus" and "zero" which correspond to the PLUS flag, the MINUS flag and the ZERO flag, respectively) in accordance with the following equations.

(1) In case of performing a multiplication operation $(\underline{ab})$, plus = $((a>0)$ and $(b>0))$ or $((a<0)$ and $(b<0))$ minus = $((a<0)$ and $(b>0))$ or $((a>0)$ and $(b<0))$ zero = $((a=0)$ or $(b=0))$;

(2) In case of performing an addition operation $(\underline{a}+\underline{b})$, plus = $(a>0)$ and $(b>0)$ minus = $(a<0)$ and $(b<0)$; and (3) In case of performing a subtraction operation $(\underline{a}-\underline{b})$, plus = $(a>0)$ and $(b<0)$ minus = $(a<0)$ and $(b>0)$.

Furthermore, the pre-read result flag generating portion 8 can generate the pre-read result flags (namely, the PLUS flag, the MINUS flag and the ZERO flag), which are defined by more complex equations, from the intermediate results outputted by the execution portion 1. For instance, in case where a term $(a_{exp} - b_{exp})$, of which $a_{exp}$ and $b_{exp}$ are exponents parts of input data $\underline{a}$ and $\underline{b}$, respectively, is obtained as the intermediate result, the pre-read result flags of which the values are given by the following equations:

(4) In case of performing an addition $(\underline{a}+\underline{b})$, plus = $[(a>0)$ and $(b<0)$ and $((a_{exp}-b_{exp})>0)]$ or $[(a<0)$ and $(b>0)$ and $((a_{exp}-b_{exp})<0)]$ minus = $[(a>0)$ and $(b<0)$ and $((a_{exp}-b_{exp})<0]$ or $[(a<0)$ and $(b>0)$ and $((a_{exp}-b_{exp})>0)]$ zero = $[(a_{exp}-b_{exp})\neq 0]$; and (4) In case of performing a subtraction $(\underline{a}-\underline{b})$, plus = $[(a>0)$ and $(b>0)$ and $((a_{exp}-b_{exp})>0]$ or $[(a<0)$ and $(b<0)$ and $((a_{exp}-b_{exp})<0)]$ minus = $[(a>0)$ and $(b>0)$ and $((a_{exp}-b_{exp})<0]$ or $[(a<0)$ and $(b<0)$ and $((a_{exp}-b_{exp})>0)]$ zero=$[(a_{exp}-b_{exp})\neq 0]$.

This means that when the term $(a_{exp}-b_{exp})$ is not equal to zero, the ZERO flags in cases of performing the addition and subtraction do not become equal to zero. Incidentally, it is indicated by the pre-read result flag determination signal outputted from the pre-read result flag generating portion 8 which of the pre-read result flags (namely, the PLUS flag, the MINUS flag and the ZERO flag) is determined. Thus, by monitoring the pre-read result flag determination signal, the instruction fetch address generating portion 3 can easily detect which of the pre-read result flags is determined. When a branch instruction is executed, the control portion 7 judges from the pre-read result flag, of which the determination is indicated by the pre-read result flag determination, whether or not the branch condition of the branch instruction is satisfied (namely, whether or not the corresponding branch is to be taken). If the branch is taken, the control portion 7 controls the selector 6 such that the selector 6 selects a target instruction address, thereby executing the branch instruction.

Figure 2:
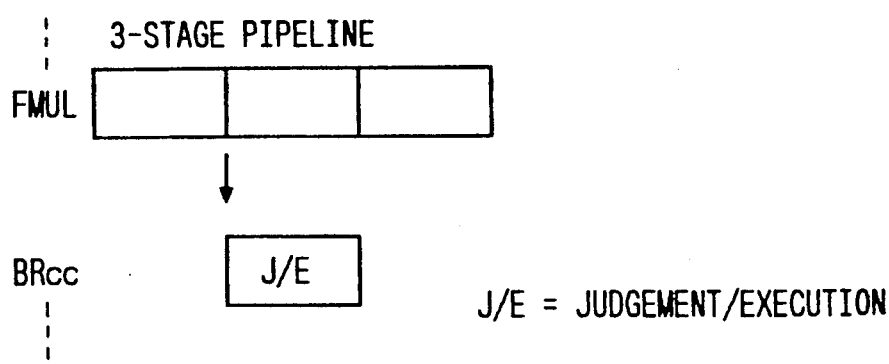
FIG. 2 is a timing diagram for illustrating an operation of executing a program in the processor of FIG. 1.
Figure 4:
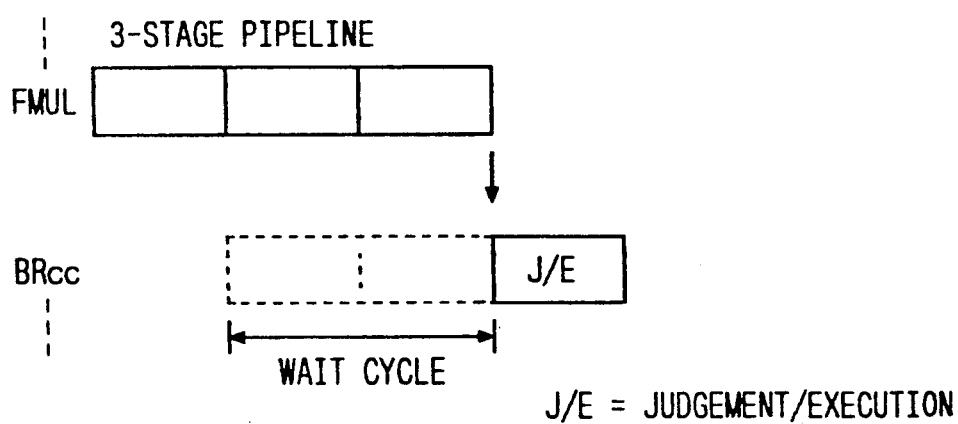
FIG. 4 is a timing diagram for illustrating an operation of executing a program in the prior art processor of FIG. 3.
Figure 3:
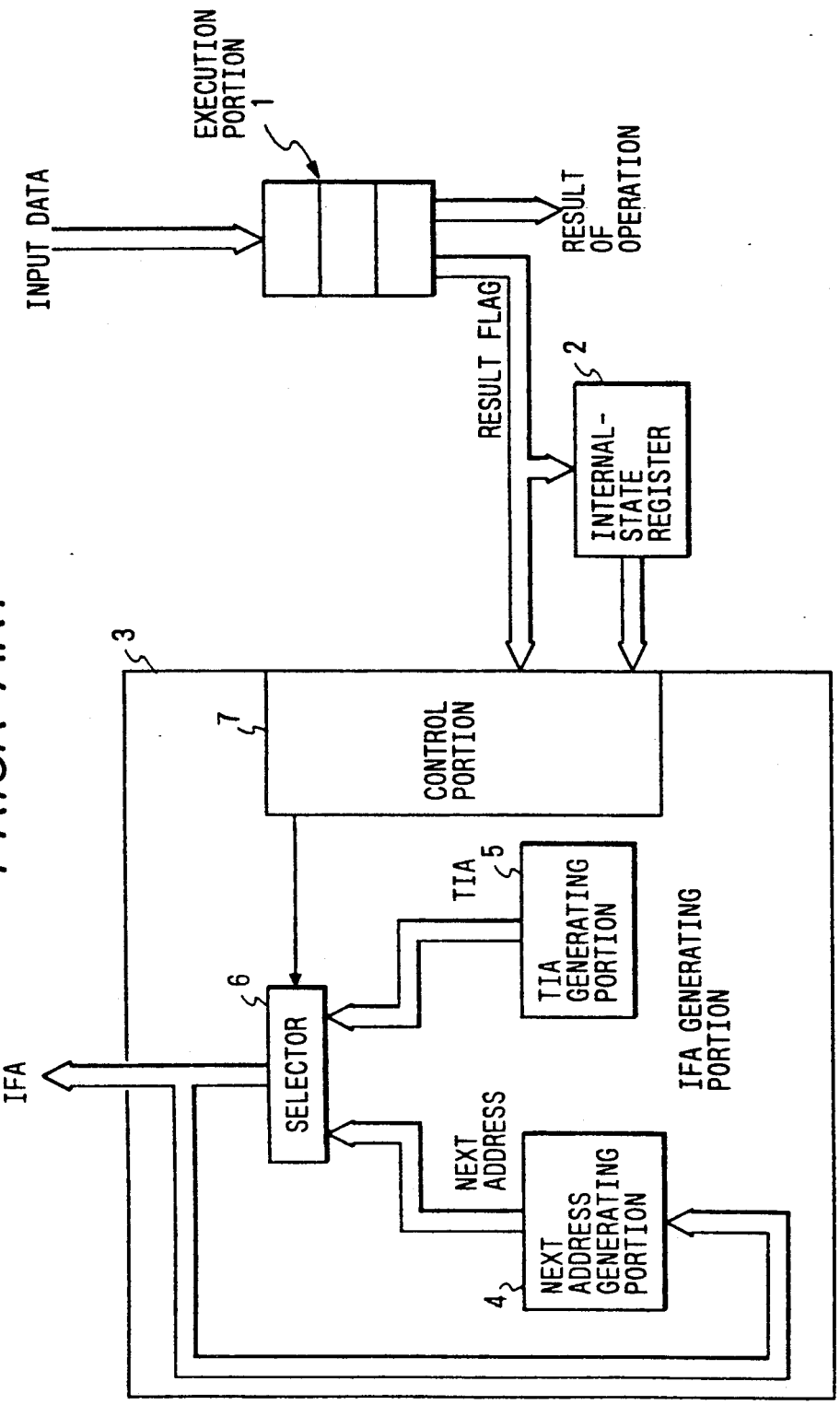
FIG. 3 is a schematic block diagram for illustrating the construction of a prior art processor.

Hereinafter, an operation of this processor embodying the present invention will be described in detail. Similarly as in case of the prior art processor, an operation of executing a conditional branch instruction by using an assembler program will be described hereinbelow by way of example. Referring next to FIG. 2, there is illustrated the timing of operations of the processor of FIG. 1 when this program is executed. First, the floating-point multiplication instruction FMUL is executed in the execution portion 1 by performing a three-stage pipeline processing. The execution portion outputs the result of the multiplication, as well as the result flag, when receiving three clock pulses after an input of data. In parallel with the execution of the FMUL instruction in the execution portion 1, the input data is also inputted to the pre-read result flag generating portion 8. Then, as described above, the pre-read result flag is generated in the portion 8. Such a result flag which can be determined before a result of a corresponding operation is obtained is outputted to the instruction fetch address generating portion 3 as a pre-read result flag. Simultaneously, a pre-read result flag determination signal indicating which of the outputted flags is definitely determined is outputted to the instruction fetch address generating portion 3 which monitors the pre-read result flags. If the flag to be used by the conditional branch instruction BRcc is definitely determined, the portion 3 judges by using the determined pre-read result flag whether or not the branch is taken. Most of the above-mentioned logic equations for generating the result flags are very simple. Thus, the generation of the result flag can be fully completed within one clock cycle. Therefore, in case where a pre-read result flag to be used by the conditional branch instruction to judge whether or not the branch is taken can be definitely determined, the conditional branch instruction can be executed without any wait cycle.

In case where the pre-read result flag is generated by using the intermediate results, a time required for executing a conditional branch instruction is longer than the time required in case where the pre-read result flag is generated by using the input data. However, in case where the pre-read result flag is generated by using the intermediate results, the conditional branch instruction can be executed until the result of the operation is outputted from the execution portion 1. Thus, a conditional branch instruction can be executed at a high speed.

Further, depending on a kind of an operation to be performed and on input data, there may occur cases where result flags are not definitely determined until the operation is completed and the result of the operation is definitely determined. Even in such cases, the pre-read result flag determination signal is monitored, so that the program can be executed without any conflict by inserting a wait cycle until a pre-read result flag is definitely determined. It is, however, very rare that a pre-read result flag is not determined until a corresponding operation is completed. In most cases, a conditional branch instruction can be executed at a high speed by using a pre-read result flag without any wait cycle.

While a preferred embodiment of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A processor including an execution portion having an n-stage pipeline for performing an operation on input data and for outputting the result of the operation and a result flag representing the state of the result of the operation, an internal-state register for storing the result flag as data indicating the internal state of the processor, an instruction-fetch-address generating portion for determining from the data indicating the internal state of the processor or from the result flag whether or not a branch condition of a conditional branch instruction is satisfied and for generating an instruction fetch address, said processor further comprising:

a pre-read result flag generating portion for receiving the input data and for outputting to the instruction-fetch-address generating portion a pre-read result flag, generated by evaluating the input data prior to the completion of the operation effected in the execution portion, and a pre-read result-flag determination signal indicating that the pre-read result flag is determined, wherein the instruction-fetch-address generating portion determines whether or not the branch condition of the conditional branch instruction is satisfied by using the pre-read result flag, the determination of which is indicated by the pre-read result-flag determination signal, and generates an instruction fetch address.

2. A processor as set forth in claim 1, wherein the execution portion outputs an intermediate result obtained by each stage of the n-stage pipeline to the pre-read result flag generating portion and wherein the pre-read result flag generating portion outputs the pre-read result flag and the pre-read result flag determination signal by evaluating the intermediate results.

3. A processor as set forth in claim 1 wherein, when a conditional branch instruction is executed by using a pre-read result flag indicated by the pre-read result flag determination signal as being indefinite, the execution of the conditional branch instruction is delayed until the pre-read result flag is determined.

4. A processor as set forth in claim 1, wherein said execution portion comprises execution delay means, said execution delay means responsive to an indication by the pre-read result flag determination signal that a pre-read result flag, used in executing a conditional branch instruction, is not definite by delaying execution of the conditional branch instruction until the pre-read result flag becomes definite.

5. A processor as set forth in claim 1 wherein, upon determining that the branch condition of the conditional branch instruction is satisfied, said instruction-fetch-address generating portion generates said instruction fetch address prior to completion of the operation performed by the n-stage pipeline of said execution portion.

6. A processor as set forth in claim 1 wherein, upon determining that the branch condition of the conditional branch instruction is satisfied, said instruction-fetch-address generating portion generates said instruction fetch address prior to outputting of said result flag by the n-stage pipeline of said execution portion.

* * * * *